(12) United States Patent
Banerjee et al.

(10) Patent No.: US 8,332,690 B1
(45) Date of Patent: Dec. 11, 2012

(54) METHOD AND APPARATUS FOR MANAGING FAILURES IN A DATACENTER

(75) Inventors: Anindya Banerjee, Pune (IN); Bijaya Laxmi Nanda, Pune (IN); Navin Kabra, Pune (IN)

(73) Assignee: Symantec Corporation, Mountain View, CA (US)

( * ) Notice: Subject to any disclaimer, the term of this patent is extended or adjusted under 35 U.S.C. 154(b) by 224 days.

(21) Appl. No.: 12/147,767

(22) Filed: Jun. 27, 2008

(51) Int. Cl.
*G06F 11/00* (2006.01)
(52) U.S. Cl. .......................................................... 714/26
(58) Field of Classification Search ...................... 714/26
See application file for complete search history.

(56) References Cited

U.S. PATENT DOCUMENTS

| 6,947,797 B2* | 9/2005 | Dean et al. .................. 700/79 |
| 2008/0065577 A1* | 3/2008 | Chefalas et al. ............. 706/47 |

\* cited by examiner

*Primary Examiner* — Bryce Bonzo
(74) *Attorney, Agent, or Firm* — Campbell Stephenson LLP

(57) ABSTRACT

A method and apparatus for providing information to mitigate a current failure in a datacenter is described. The method comprises processing historical data regarding at least one failure. The historical data includes at least one action related to the at least one failure. The method further includes determining information for mitigating the current failure based on the historical data.

22 Claims, 3 Drawing Sheets

US 8,332,690 B1

METHOD AND APPARATUS FOR MANAGING FAILURES IN A DATACENTER

BACKGROUND

1. Technical Field

Embodiments of the present invention generally relate to network management systems and, more particularly, to a method and apparatus for a current failure occurring in a datacenter of the network.

2. Description of the Related Art

Data is the underlying resource on which all computing processes are based. With the recent explosive growth in demand on data storage systems, different storage networking applications or configurations like Network Attached Storage (NAS) or Storage Area Network (SAN) have come into existence. Today's complex storage networks require sophisticated software applications to plan, discover, configure and monitor many components and technologies that make up the storage network infrastructure. Once storage networks, for example, Storage Area Networks (SANs) become established, the availability of storage resources is an essential requirement.

Computers are often used to store valuable data as society has been increasingly software driven in recent years. Because of calamity or other failures within any computer system, valuable data may be lost. Therefore, it is extremely important that such data be safely stored and retrievable. Under such a circumstance, it is essential to provide a storage system or a data redundancy and establishes proper means for storage system/data recovery.

But in many data processing systems (e.g., a file server for storage area network and the like), failures occur very often. Such failures may be addressed by a system administrator. The duties of the system administrator include securing the data processing system from intrusions and maintaining the performance and stability of resources for a plurality of client computers in order to ensure productivity.

When a failure occurs, the system administrator may determine a root cause of the failure and then follows a procedure for fixing or mitigating the failure. The procedure includes a series of manual actions executed by the system administrator. After the failure is fixed or mitigated, the system administrator should make substantially the same determinations if the failure recurs. The system administrator may not remember the earlier performed actions and thus wastes a significant amount of time in fixing or mitigating the same failure. Furthermore, a different system administrator may not know the procedure used earlier by the system administrator and will have to spend a significant amount of time figuring out a substantially similar or even exactly the same procedure.

Therefore, there is a need in the art for a method and apparatus for managing failures in the datacenter where information for mitigating a current failure is used to support the system administrator in a time and cost-efficient manner.

SUMMARY

Embodiments of the present invention comprise a method and system for mitigating a current failure occurring in a datacenter. In one embodiment, the method for providing information for mitigating the current failure is described. In one embodiment, the method comprises processing historical data regarding at least one failure. The historical data includes at least one action related to the at least one failure. The method further includes determining information for mitigating the current failure based on the historical data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one" and the word "plurality" mean one or more, unless otherwise mentioned.

DETAILED DESCRIPTION

In a datacenter where data is processed, a failure may occur within hardware or software resources (e.g., devices, services, processes and appliances) of the datacenter. The failure may further lead to data loss and thus, adversely impact the operation of data processing systems. The failure needs to be fixed by a system administrator as soon as possible to prevent any harm from occurring due to the failure. Embodiments of the present invention herein include a method and apparatus for determining and suggesting information to mitigate a current failure using historical data regarding previous failures and one or more steps or actions performed to remedy the previous failures.

Figure 1:
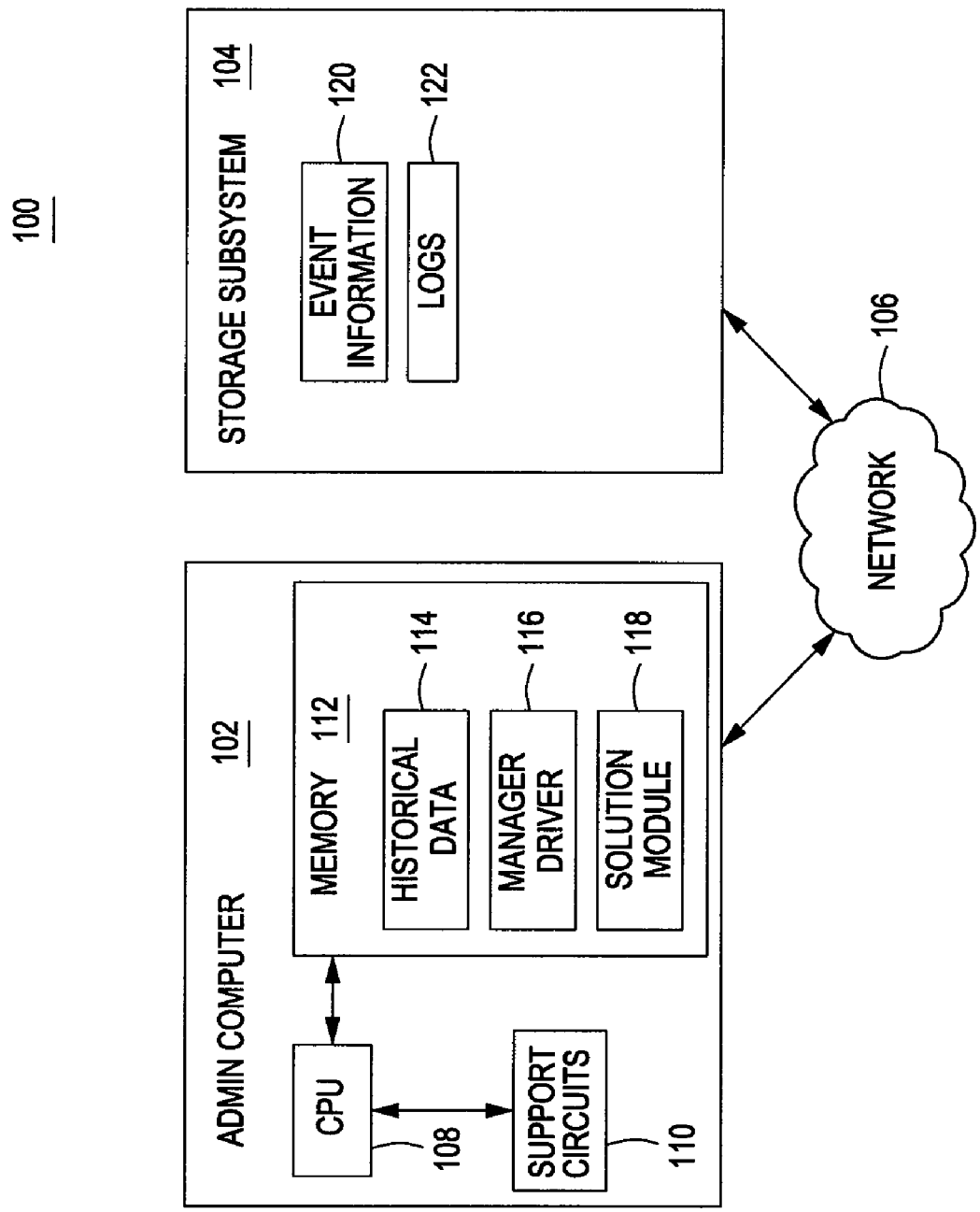
FIG. 1 is a block diagram of a system for mitigating a current failure in a datacenter according to an embodiment of the present invention.

FIG. 1 illustrates a system 100 for managing a current failure in a datacenter. The system 100 includes an administrator computer 102 and a storage subsystem 104, each coupled to each other through a network 106.

The administrator computer 102 is configured to manage the network 106 in case of occurrence of the failures in the datacenter. The failures may be a disk I/O error, a non-accessibility of a port among various others. The administrator computer 102 may be a server, a desktop computer, a laptop, a mobile computing device (e.g., cell phones and Personal Digital Assistants (PDAs)) and/or the like. The CPU 108, the support circuits 110 and the memory 112 are configured to operate as a computing unit. The CPU 108 may include one or more commercially available microprocessors or microcontrollers. Alternatively, the CPU 108 may include one or more Application Specific Integrated Circuits (ASIC). The support circuits 110 include various circuits used to support functionality of the CPU 108, for example, one or more clock circuits, buses, power supplies, network cards, and the like. The memory 112 may be a Read Only Memory (ROM), a Random Access Memory (RAM), an Electrically Erasable Programmable Read Only Memory (EEPROM), a Flash memory, magnetic storage, a removable storage memory and the like. The memory 112 further includes various data, such as historical data 114.

The historical data 114 refers to information regarding one or more previous failures as well as one or more actions performed to mitigate or remedy the one or more previous failures within a failure window. Generally, the failure window further indicates a time period from detection of a particular failure to correction of the particular failure. In one embodiment, the historical data 114 includes a mapping between the particular failure and one or more actions taken to mitigate the particular failure.

The storage subsystem 104 is employed to store the data within the datacenter of the network. The storage subsystem 104 may include data storage devices, computers and/or components (e.g., switches) for transmitting the data throughout the datacenter. The data storage devices may further include disk systems and tape systems, and the like.

The storage subsystem 104 further includes event information 120 and logs 122. In one embodiment, the event information 120 refers to events that occur within the storage subsystem 104 (e.g., events related to data storage devices or components, such as disk input/output events, SAN change events and/or the like). Occasionally, failures (e.g., configuration failures, I/O errors, component failures and/or the like) occur within the datacenter. Events related such failures are also stored in the event information 120. The event information 120 may also include a cause of the failure may be disk damage, memory bottlenecks, a power loss, a disconnected chord and/or the like.

The logs 122 are configured to store the data regarding various computer activities within the datacenter. Such data may include the steps or actions performed to remedy the one or more previous failures occurred within the datacenter along with various computer operations. The steps or actions performed may be a series of steps or actions taken during a failure window (i.e. from the time of detection of the failure to the time of correction of the failure). In one embodiment, every step or action whether it is relevant or irrelevant for remedying the failure is maintained in the logs 122. For example, the system administrator may send one or more e-mails during the failure window that are unrelated to any previous failure and such email activity is captured in the logs 122. The logs 122 thus captures each and every step or action performed (e.g., by the administrator computer 102) during each failure window within the datacenter. According to one embodiment of the invention, the logs 122 store patterns of actions or steps performed by the administrator computer 102. For example, a particular pattern of actions may be associated with similar failures. Hence, there is a strong likelihood that such actions remedy the similar failures and may be used by the system administrator to mitigate current or future similar failures.

Generally, many products, for example, devices, components, software and the like, are associated with the logs 122 and include information regarding the failures and/or changes in the SAN configuration. The logs 122 may also include management software actions and configuration changes during a failure window. For example, the logs 122 may include data describing software activity (i.e., actions performed by various software packages).

In another embodiment of the present invention, the logs 122 include the multiple log files. The different log files are correlated to each other to determine information about the steps or actions taken by the system administrator during the failure window. In another embodiment, the multiple log files are analyzed by identifying the patterns stored within the log files. The patterns further indicate the steps or actions performed by the system administrator during the windows of operation of each failure. For example, if there is a disk failure, then the steps or actions taken by the administrator computer 102 during the window of fixing the disk failure are stored in some specific patterns in the log file.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like. Furthermore, the network 106 includes a Storage Area Network (SAN).

As described above, the historical data 114 includes information regarding the steps or actions performed by the administrator computer 102 for each failure. In one embodiment of the present invention, the historical data 114 maintains the steps or actions which were performed through management software during each failure window. In other embodiment of the present invention, the information regarding a set of SAN change events which were seen during the each failure window is further maintained in the historical data 114. In another embodiment, the historical data 114 indicates one or more patterns of actions or events (e.g., SAN change events) for one or more similar failures. In one embodiment of the present invention, the historical data 114 includes root cause analysis performed for the one or more previous failures. The root cause analysis may have been performed by the system administrator manually or through software. The historical data 114 may further include information regarding an application of a datacenter management policy on the current failure.

In another embodiment of the present invention, a heuristic clusterization of failure events are performed in a case when number of the failure events associated with the failure becomes large. For example, if multiple failure events (e.g., disk I/O error, and the like) occur which finally result in the disk failure, then the multiple failure events are categorized as a disk failure type. In another embodiment of the present invention, the historical data 114 is generated by utilizing the steps or actions used to mitigate the previous failures.

In one embodiment of the present invention, the historical data 114 is correlated with information regarding the current failure to determine the one or more suggestions for mitigating the current failure. The correlation of the historical data 114 further includes comparing the current failure with the historical data 114 to determine the steps or actions to be performed to mitigate the current failure. In other embodiments, the information regarding the steps or actions to be performed is shown as a list of corrective actions in the form of hits. Further, the information obtained may be irrelevant to fix the current failure. If the obtained information is irrelevant, then the historical data may further be modified by removing the irrelevant information.

In one embodiment of the present invention, the historical data 114 is processed by examining the event information 120. The event information 120 is examined to identify the window associated with the corresponding failure. In another embodiment, portion of the logs 122 are analyzed to produced the historical data 114. The logs 122 are analyzed to identify the steps or actions which were performed during the window of the corresponding failure. In another embodiment of the invention, the logs 122 are analyzed by identifying the patterns stored within the portion of the logs 122. The patterns in the logs 122 include the actions performed during the window of the failure. In further embodiment of the present invention, the historical data 114 is processed by monitoring configuration failure events, datacenter change events or management software activity.

The manager 116 is configured to access the data stored in the event information 120 and the logs 122 to generate the historical data 114. In one embodiment, the manager 116 accesses the event information 120 to determine the window for each failure. The manager 116 accesses the logs 122 for various configuration products (e.g., VERITAS Volume Manager) and/or the event information 120 of the storage subsystem 104. In another embodiment of the present invention, the manager 116 correlates various portions of the logs 122 and/or the event information to determine the steps or actions taken by the administrator computer 102 during the window of each failure. Some actions are relevant to correcting the failure and some are not relevant.

In one embodiment, the manager 116 identifies patterns within log lines in the logs 122 that correspond to the steps or actions taken by the system administrator during each failure window. In another embodiment, the manager 116 applies rules to determine such patterns. Then, the manager 116 accesses data that the event information 120 has stored. The data comprises actions taken by the system administrator during each failure window. Based on the logs 122 and the data stored by the event information 120, the historical data 114 is generated by the manager 116.

The solution module 118 is configured to compare or correlate the current failure with the historical data 114 to determine the actions (e.g., the steps or instructions) for mitigating the current failure. In another embodiment, a list of the actions is presented as hits after comparing the current failure with the historical data 114. The hits may include one or more actions or steps which are not relevant for fixing the current failure. The actions may be further refined by removing the one or more actions which are not statistically relevant to mitigate the current failure.

Figure 2:
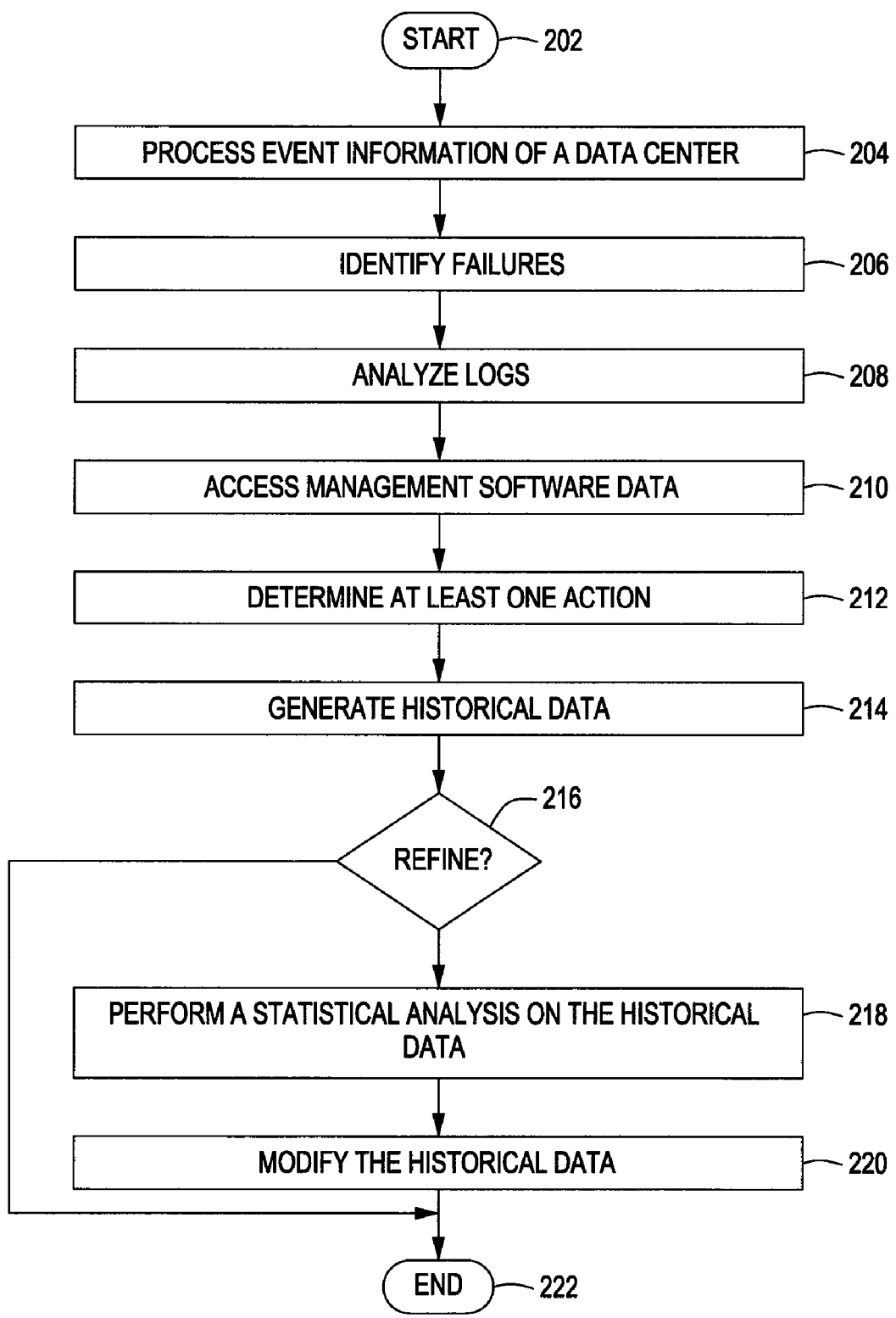
FIG. 2 is a flow diagram of a method for processing historical data, according to an embodiment of the present invention.

FIG. 2 illustrates a method 200 for processing historical data according to one embodiment of the present invention. The method 200 starts at step 202 and proceeds to step 204.

At step 204, event information, within a datacenter is processed. At step 206, one or more failures are identified. At step 208, one or more logs, (e.g., the logs 122 of FIG. 1), are analyzed. At step 210, management software data is accessed. At step 212, at least one action for mitigating the one or more failures is determined. At step 214, historical data, (e.g., the historical data 114 of FIG. 1) is generated. At step 216, a determination is made as to whether the historical data (e.g., the historical data 114 of FIG. 1) is to be retained. If the historical data is not to be refined (option "NO"), then the method 200 proceeds to end at step 222. If the historical data is to be refined (option "YES"), then the method 200 proceeds to step 218. At the step 218, a statistical analysis on the historical data, is performed. The step 218 proceeds to step 220 at which the historical data is modified. The step 220 ends at the step 222.

According to one embodiment of the present invention, a failure occurs due to which computing machine does not operate properly. The reason for the failure may be power fluctuation, disk failure among various others. Similar failure may have been occurred earlier, so the event information is accessed to check whether the similar failure had occurred earlier. If the similar failure is identified in the event information, then the logs related to the failures are analyzed. The logs stores information regarding the actions which were performed earlier by the system administrator, for mitigating the failure. The management software is also accessed to retrieve the data regarding the actions that were performed to mitigate the failure. Such actions (i.e. the corrective actions performed through the management software, for example, creation of new mirror, rezone to make another disk visible for some particular hosts and the like) are also accessed. Such corrective actions are thus determined utilizing the data stored in the logs and the management software. The information regarding the corrective actions performed to fix the failure is utilized to generate the historical data.

Figure 3:
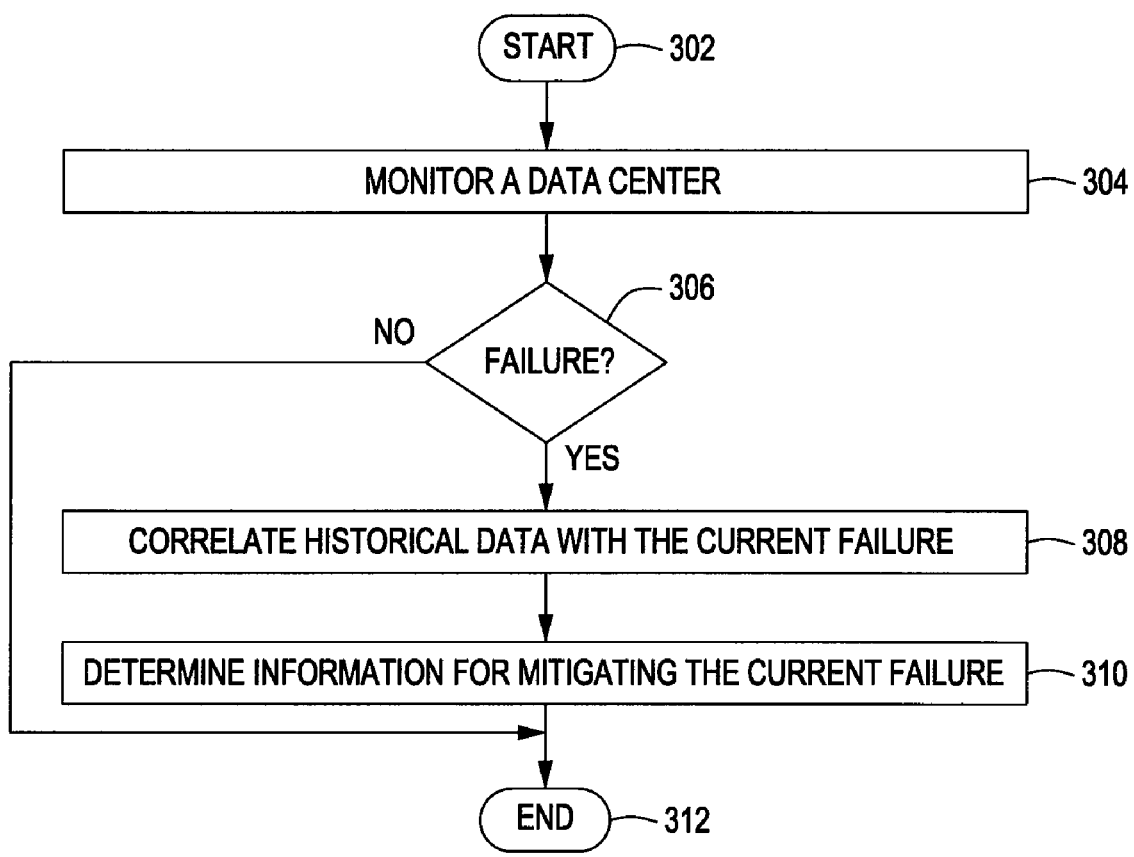
FIG. 3 is a flow diagram of a method for determining information for mitigating a current failure in a datacenter according to an embodiment of the present invention.

FIG. 3 is a flow diagram of a method 300 for determining information to mitigate the current failure. The method 300 starts at step 302, and proceeds to step 304.

At the step 304, a datacenter is monitored. At step 306, a determination is made as to whether a failure occurs within the datacenter. If the failure does not occur within the datacenter (option "NO"), then the method 300 proceeds to end at step 312. If the failure occurs within the datacenter (option "YES"), then the method 300 proceeds to step 308. At the step 308, historical data is correlated with the current failure. At step 310, information for mitigating the current failure is determined. The step 310 proceeds to end at the step 312.

In one embodiment of the present invention, a current failure is a computer bootup failure. If a similar failure had occurred earlier, then a list of the actions which were performed earlier are extracted from the historical data, for example the historical data 114. The list of the actions performed earlier is shown as hits to the system administrator. The hits are shown to suggest remedial actions which may be performed by the system administrator to mitigate the current failure. In case, if multiple instances of the similar failure are found in the historical data, for example the historical data 114, then the lists of associated actions are correlated. The lists are correlated to determine if any common steps or actions emerge. If the common steps emerge, then the common steps are shown as most likely procedure to be utilized for mitigating the current failure.

The various embodiments discussed herein offer various advantages. If the similar problem occurs repeatedly, it is easier to determine the solution to overcome the failure along with a large number of other options. Further the embodiments described herein provide automatic mitigation of the failures, so the time consumed by the system administrator to fix the failure is greatly reduced.

While the foregoing is directed to embodiments of the present invention, other and further embodiments of the invention may be devised without departing from the basic scope thereof, and the scope thereof is determined by the claims that follow.

The invention claimed is:

1. A method comprising:
    processing historical data regarding a plurality of prior failures, wherein the plurality of prior failures comprises a first failure and a second failure;
the historical data relates to
a first plurality of earlier actions performed in a first window of time, wherein
the first window of time consists of a time period from a detection of the first failure to a correction of the first failure, and
a second plurality of earlier actions performed in a second window of time, wherein
the second window of time consists of a time period from a detection of the second failure to a correction of the second failure, and
the second failure is distinct from the first failure;
comparing the first plurality of earlier actions and the second plurality of earlier actions;
identifying corrective actions, wherein the identifying the corrective actions is based at least in part on correlation patterns identified by the comparing; and
determining, based at least in part on the identifying, information for mitigating a current failure, wherein
the current failure is distinct from the first and second failures.

2. The method of claim 1, wherein the determining information for mitigating the current failure comprises:
correlating the historical data with the current failure.

3. The method of claim 2, wherein the correlating the historical data comprises:
determining at least one action for mitigating the current failure.

4. The method of claim 2, wherein the correlating the historical data comprises:
modifying the information for mitigating the current failure.

5. The method of claim 4, wherein the modifying the information for mitigating the current failure comprises:
removing a portion of the information for mitigating the current failure.

6. The method of claim 1, wherein the processing the historical data comprises:
identifying the first window of time, wherein the identifying the first window of time comprises
examining event information.

7. The method of claim 6, wherein the processing the historical data comprises:
identifying at least one action for mitigating the first failure during the first window of time, wherein the identifying the at least one action comprises
analyzing a plurality of logs related to a datacenter.

8. The method of claim 7, wherein the analyzing the plurality of logs comprises:
identifying at least one common pattern among the plurality of logs, wherein the at least one common pattern indicates the at least one action for mitigating the first failure during the first window of time.

9. The method of claim 7, wherein the processing the historical data comprises:
generating the historical data based at least in part on
the first failure,
the at least one action for mitigating the first failure during the first window of time, and
management software data.

10. The method of claim 7, wherein the historical data comprises at least one root cause analysis performed for the first failure.

11. The method of claim 7, wherein the historical data comprises information regarding a datacenter management policy.

12. The method of claim 1, wherein the processing the historical data comprises monitoring at least one of:
configuration failure events,
datacenter change events, or
management software activity.

13. The method of claim 1, wherein the processing the historical data comprises:
identifying, based at least in part on a statistical analysis, a portion of the historical data that is not related to the first failure; and
modifying the historical data based at least in part on the statistical analysis.

14. The method of claim 13, wherein the modifying the historical data comprises:
removing the identified portion of the historical data.

15. The method of claim 13, comprising:
determining at least one action for mitigating the current failure; and
identifying an action of the at least one action that is not relevant to mitigating the first failure.

16. The method of claim 1, wherein:
the comparing comprises correlating the first plurality of earlier actions and the second plurality of earlier actions to determine any common actions among the first and second plurality of earlier actions; and
the determining the information for mitigating the current failure comprises identifying the common actions among the first and second plurality of earlier actions as a most likely procedure for mitigating the current failure.

17. The method of claim 1, wherein:
the comparing comprises correlating the first plurality of earlier actions and the second plurality of earlier actions to determine any common actions among the first and second plurality of earlier actions; and
the determining the information for mitigating the current failure comprises identifying the common actions among the first and second plurality of earlier actions as an automatic procedure for the current failure.

18. An apparatus comprising:
a memory,
a manager configured for generating historical data regarding a plurality of prior failures, wherein
the plurality of prior failures comprises a first failure and a second failure, and
the historical data relates to a plurality of actions performed following a failure; and
a processor configured to execute instructions stored in the memory, wherein
the instructions comprise instructions for identifying corrective actions, wherein the identifying the corrective actions is based at least in part on correlation patterns identified by comparing the first plurality of actions and the second plurality of actions; and
a solution module configured for correlating the historical data with information regarding a current failure to determine at least one action for mitigating the current failure.

19. The apparatus of claim 18, wherein the manager is configured for identifying an action of the at least one action that is relevant to mitigating the first failure.

20. The apparatus of claim 18, wherein the manager is configured to refine the historical data based at least in part on a statistical analysis.

21. A system comprising:
a storage subsystem, comprising:
- a memory comprising event information and a plurality of logs, wherein the event information comprises at least two prior failures,
  - the at least two prior failures comprises a first failure and a second failure, and
  - the plurality of logs comprises data regarding computer activity within a datacenter; and an admin computer, comprising:
- a manager configured for examining the event information and the plurality of logs to produce historical data that relates to
  - a first plurality of actions performed following the first failure, and
  - a second plurality of actions performed following the second failure
- a processor configured for identifying corrective actions, wherein the identifying the corrective actions is based at least in part on
  - correlation patterns identified by comparing the first plurality of actions and the second plurality of actions
- a solution module configured for correlating the historical data with information regarding a current failure to identify information for mitigating the current failure.

22. The system of claim 21, wherein the processor is configured to perform the identifying based at least in part on a statistical analysis on the historical data.

* * * * *